United States Patent [19]

Iwasaki

[11] Patent Number: 5,062,695
[45] Date of Patent: Nov. 5, 1991

[54] ZOOM LENS SYSTEM FOR USE IN A MICROFILM PROJECTION APPARATUS

[75] Inventor: Satoshi Iwasaki, Osaka, Japan
[73] Assignee: Minolta Camera Kabushiki Kaisha, Osaka, Japan
[21] Appl. No.: 486,060
[22] Filed: Feb. 27, 1990
[30] Foreign Application Priority Data

Feb. 28, 1989 [JP] Japan .................................. 1-47492

[51] Int. Cl.$^5$ .................................. G02B 15/17715/16
[52] U.S. Cl. ........................................ 359/689; 30/426
[58] Field of Search .............................. 359/680, 683

[56] References Cited

U.S. PATENT DOCUMENTS

| | | | |
|---|---|---|---|
| 3,034,404 | 5/1962 | Laurent | 350/427 |
| 3,582,203 | 6/1971 | Cox | 350/427 X |
| 3,603,669 | 9/1971 | Lai et al. | 350/427 |
| 3,890,036 | 6/1975 | Grey | 350/427 |
| 4,198,128 | 4/1980 | Ogino | 350/423 |
| 4,303,311 | 12/1981 | Nakamura | 350/427 |
| 4,696,553 | 9/1987 | Tsuji et al. | 350/427 |
| 4,733,951 | 3/1988 | Pareigat | 350/423 |
| 4,743,102 | 5/1988 | Pareigat | 350/423 |
| 4,746,204 | 5/1988 | Pareigat | 350/423 |
| 4,750,820 | 6/1988 | Pareigat | 350/423 |
| 4,824,236 | 4/1989 | Ueda | 350/427 |
| 4,838,667 | 6/1989 | Ueda | 350/427 |
| 4,887,891 | 12/1989 | Ueda | 350/427 |
| 4,979,806 | 12/1990 | Ueda | 350/423 |

FOREIGN PATENT DOCUMENTS

| | | | |
|---|---|---|---|
| 2754950 | 6/1978 | Fed. Rep. of Germany | 350/427 |
| 57-737515 | 5/1982 | Japan . | |
| 62-237414 | 10/1987 | Japan . | |
| 63-25613 | 2/1988 | Japan . | |
| 0074521 | 3/1989 | Japan | 350/423 |

Primary Examiner—Bruce Y. Arnold
Assistant Examiner—David R. Parsons
Attorney, Agent, or Firm—Price, Gess & Ubell

[57] ABSTRACT

A zoom lens system comprising, in order from an enlargement side, a first lens unit of a negative power, a second lens unit of a positive power and a third lens unit of a negative power. The first lens unit is fixed during a zooming operation from a longest focal length condition to a shortest focal length condition. The second and third lens units are movable from the enlargement side to a reduction side during the zooming operation, with a distance therebetween changing from a decrease to an increase.

14 Claims, 10 Drawing Sheets

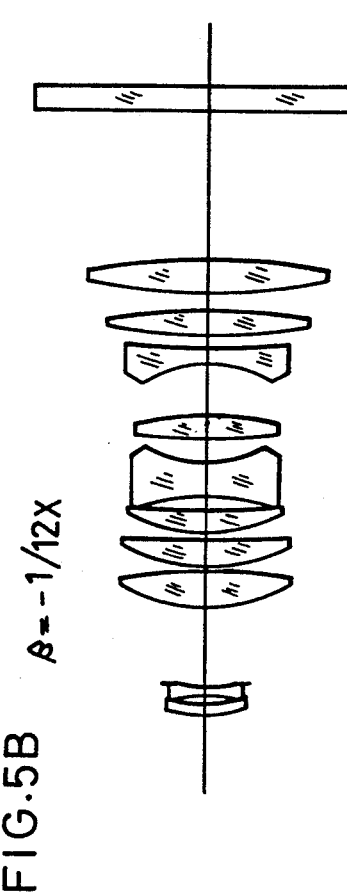
FIG.5B  $\beta = -1/12 X$
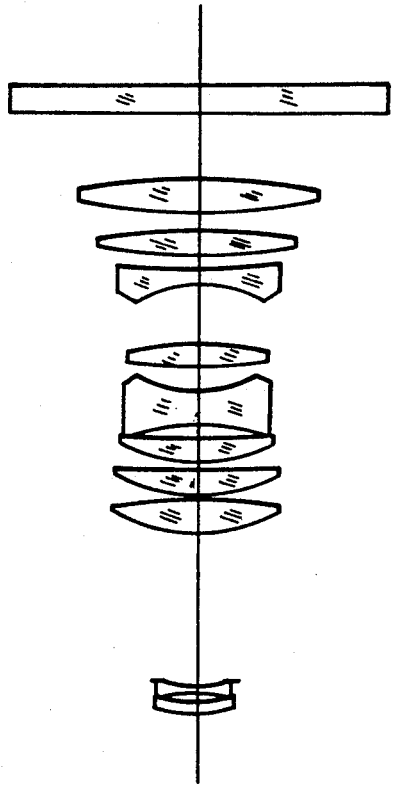
FIG.5B  $\beta = -1/16 X$
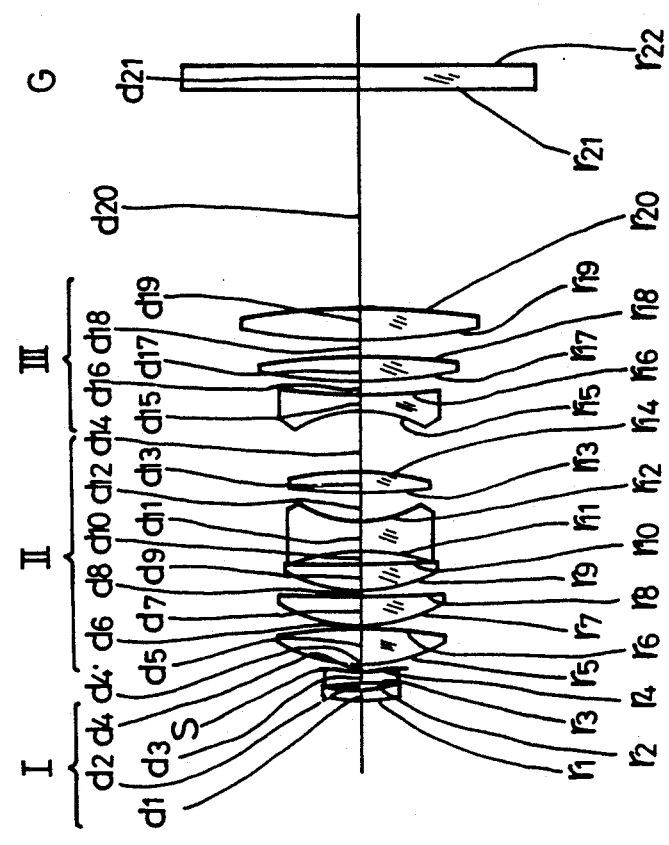
FIG.5A  $\beta = -1/9 X$ $\beta=-1/12X$ $\beta=-1/16X$ $\beta=-1/9X$

β = -1/12 X

β = -1/16 X

β = -1/9 X

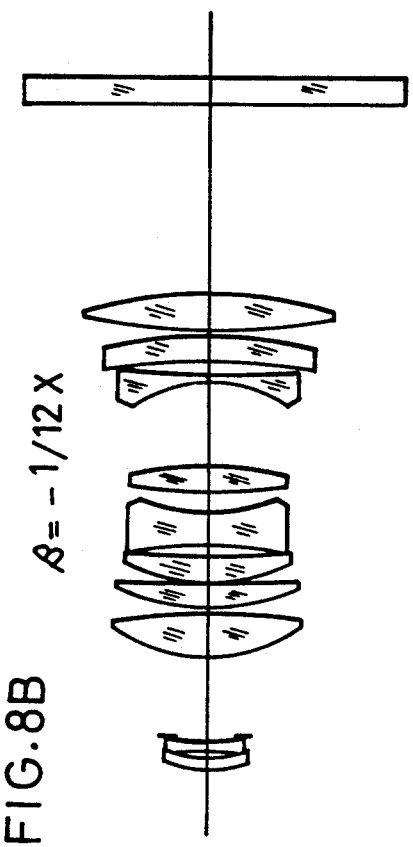
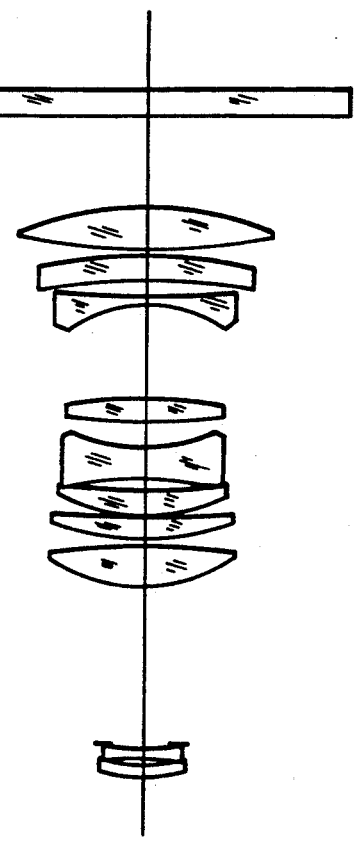
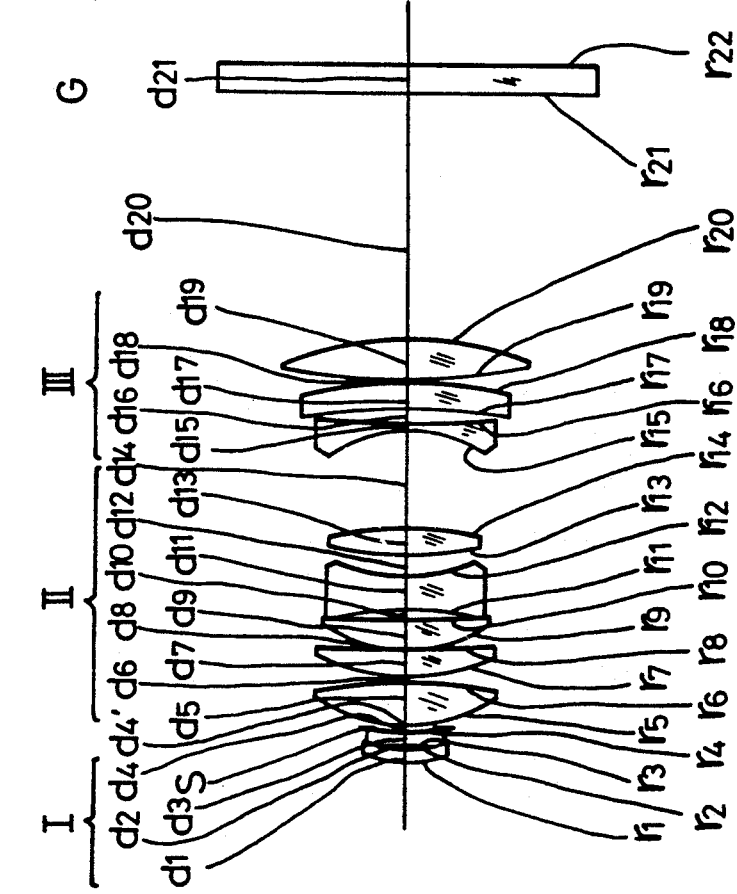

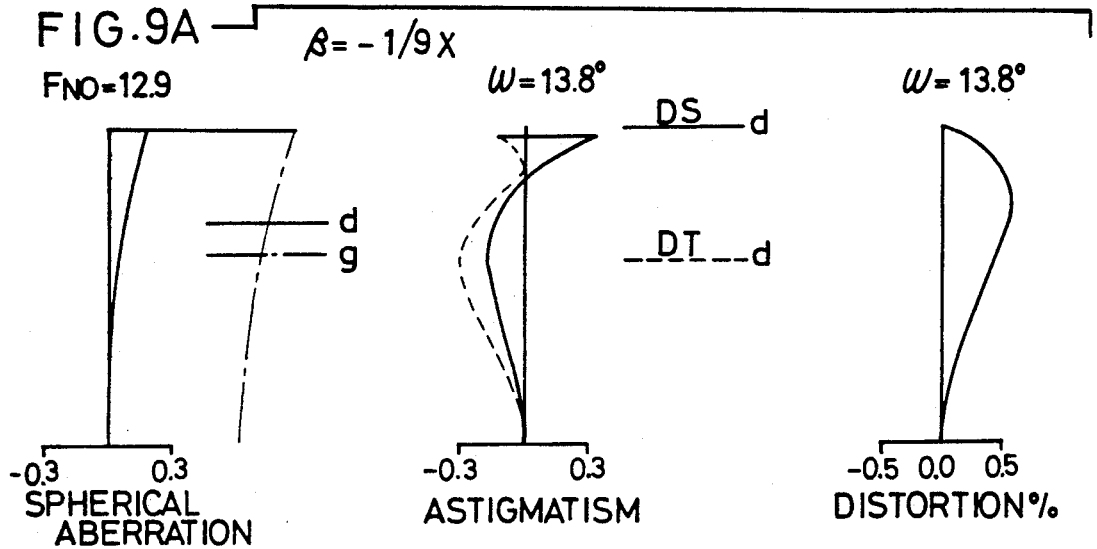
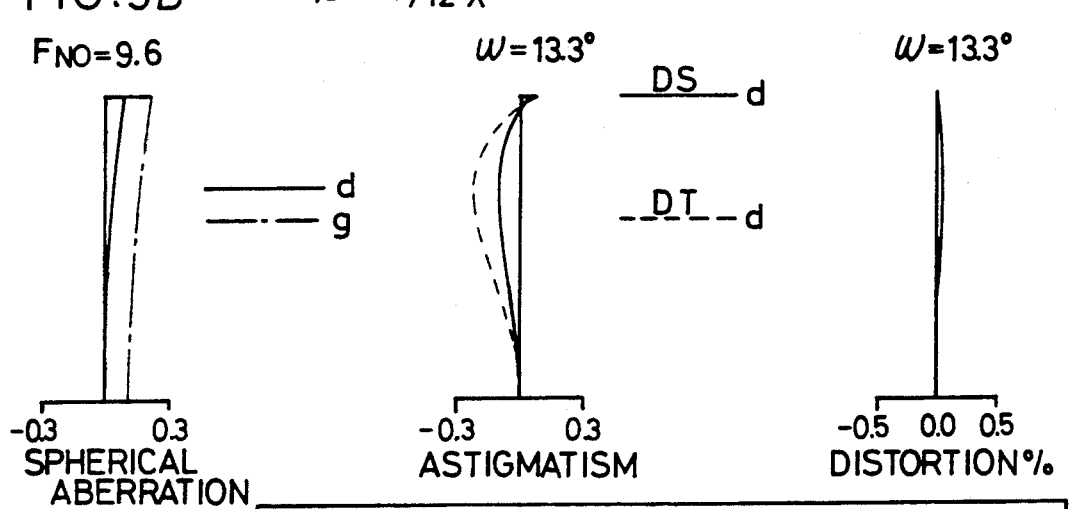
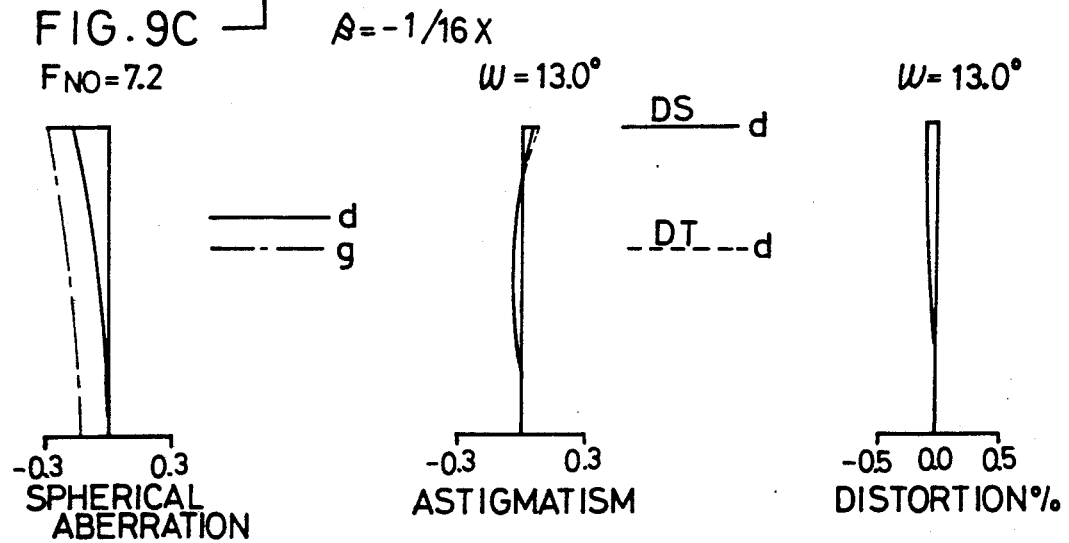

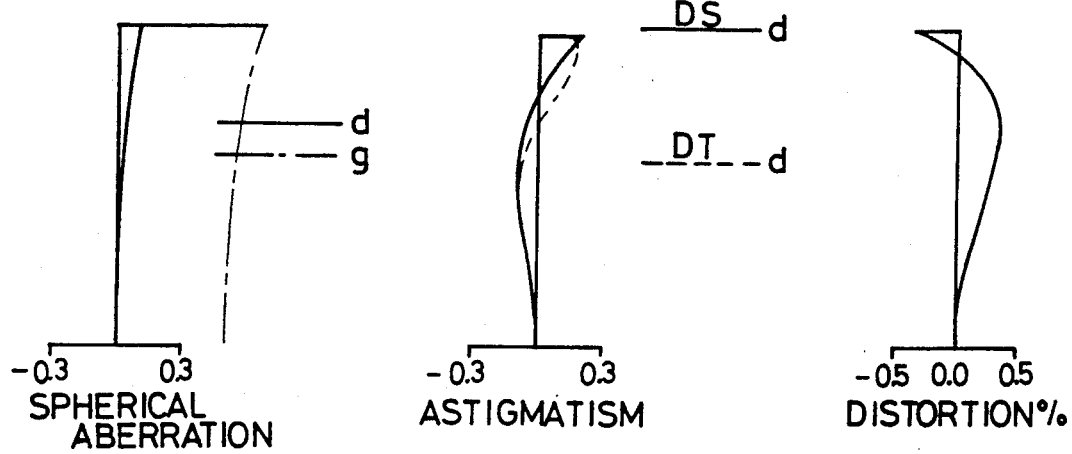
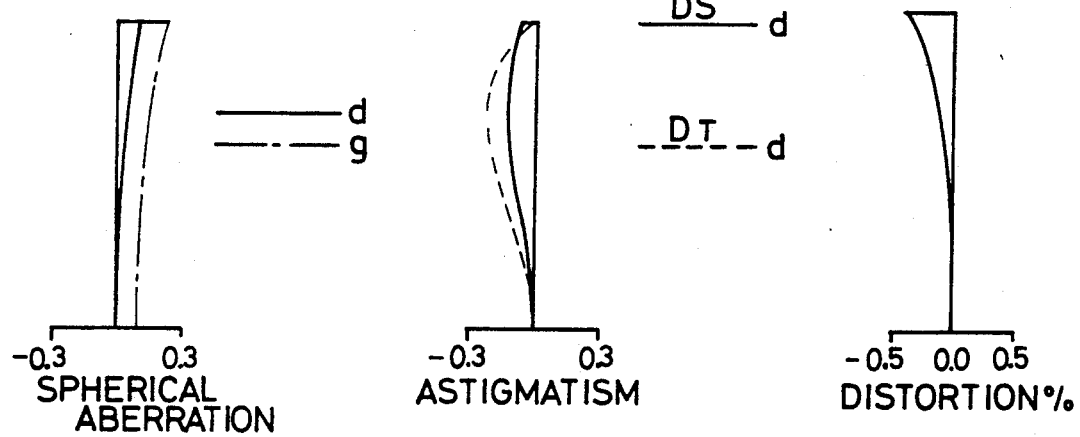
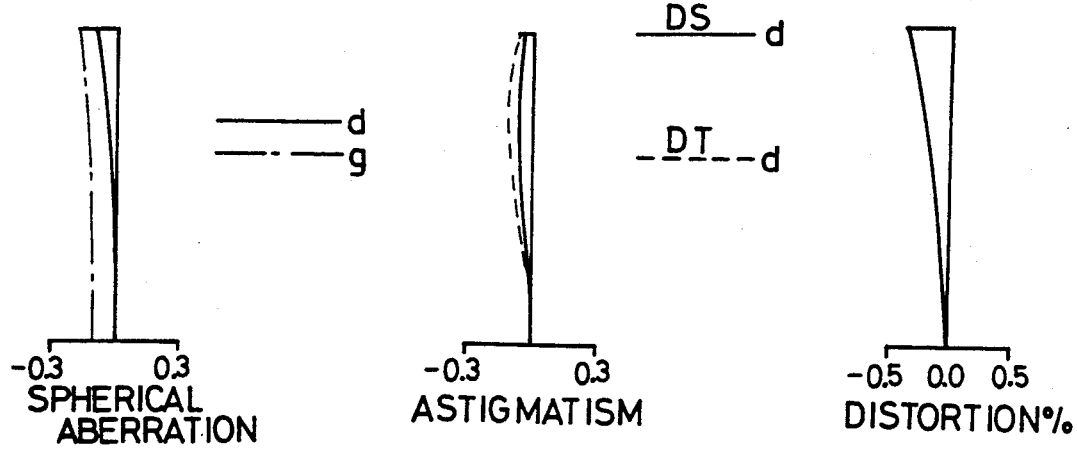

FIG. 12A  β = -1/9 X
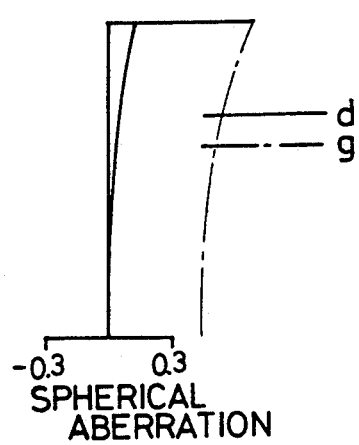
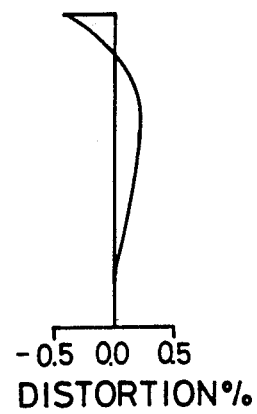
FIG. 12B  β = -1/12 X
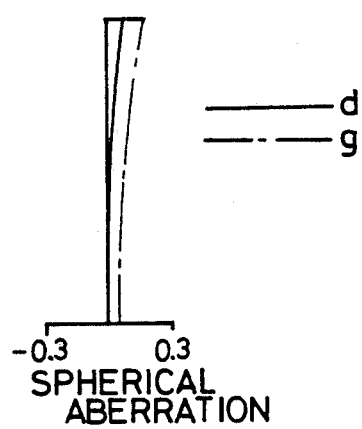
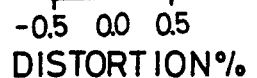
FIG. 12C  β = -1/16 X
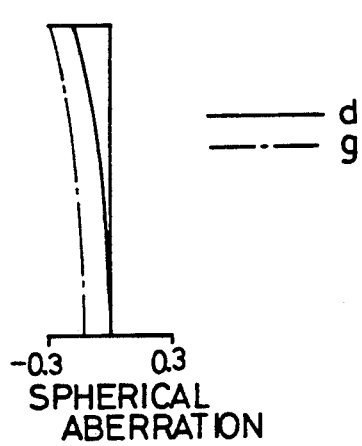
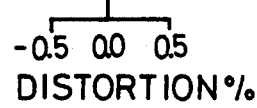

ZOOM LENS SYSTEM FOR USE IN A MICROFILM PROJECTION APPARATUS

BACKGROUND OF THE INVENTION

1. Field of the Invention

The present invention relates to a zoom lens system, and more particularly to a zoom lens system for use in an image projecting apparatus such as a microfilm reader or a microfilm reader/printer which projects microfilm images and has a limited conjugate length.

2. Description of the Prior Art

A microfilm can include a plurality of images thereon which are not always recorded in the same direction. Therefore, an image projecting apparatus such as a microfilm reader or a microfilm reader/printer has a prism disposed between a projecting lens and an image receiving plane for optically rotating images. This prism normally is disposed adjacent an enlargement side of the projecting lens, and therefore the space for accommodating the projecting lens is limited by the prism and the microfilm. Thus, this arrangement is effective to shorten the entire length of the projecting lens for compactness of the device.

Shortening the entire length of the projecting lens, however, sets a great limitation to the designing of a lens of about 10 magnifications having a long focal length. It sets an even greater limitation to a zoom lens system having a magnification range on the order of 10-power.

Zoom lens systems used as a projecting lens system of an image projecting apparatus are disclosed in U.S. Pat. No. 4,746,204, U.S. Pat. No. 4,743,102 and U.S. Pat. No. 4,750,820.

The zoom lens systems disclosed in these patents are negative-positive, two group lens systems comprising a negative lens unit at an enlargement side and a positive lens unit at a reduction side. Such a negative-positive lens system has a wide angle of view but, because of its construction, has a principal point located relatively close to the reduction side, and hence the disadvantage of having an increased overall length of the lens system.

SUMMARY OF THE INVENTION

Having regard to the above, an object of the present invention is to provide a zoom lens system of excellent performance having a magnification range on the order of 10-power.

Another object of the present invention is to provide a compact zoom lens system.

Another object of the present invention is to provide an inexpensive zoom lens system.

The above objects are fulfilled, according to the present invention, by a zoom lens system comprising, in order from an enlargement side, a first lens unit of a negative power, a second lens unit of a positive power, and a third lens unit of a negative power, wherein, during a zooming operation from a longest focal length condition to a shortest focal length condition, the first lens unit is fixed whereas the second lens unit and the third lens unit are movable from the enlargement side to a reduction side, with a distance between the second lens unit and the third lens unit changing from a decrease to an increase in length.

BRIEF DESCRIPTION OF THE DRAWINGS

These and other objects or features of the present invention will become apparent from the following description of a preferred embodiment thereof taken in conjunction with the accompanying drawings, in which:

FIGS. 5A, 5B and 5C through 8A, 8B and 8C are sectional views of lens constructions in Examples 1 through 4, the figures affixed with A showing arrangements of the respective examples in a longest focal length condition, the figures affixed with B showing those in an intermediate focal length condition, and the figures affixed with C showing those in a shortest focal length condition, FIGS. 9A, 9B and 9C through 12A, 12B and 12C show aberration curves in Examples 1 through 4, the figures affixed with A showing aberration curves of the respective examples in the longest focal length condition, the figures affixed with B showing those in the intermediate focal length condition, and the figures affixed with C showing those in the shortest focal length condition.

DESCRIPTION OF THE PREFERRED EMBODIMENT

Figure 2:
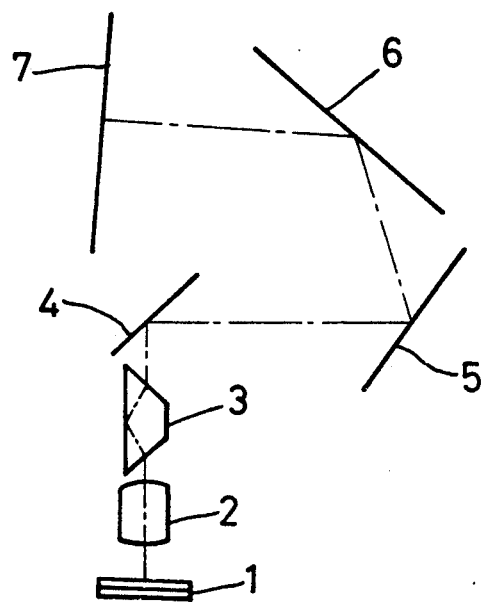
FIG. 2 is a schematic view of an optical path of a microfilm projecting apparatus to which the zoom lens system of the present invention is applied.

FIG. 2 shows an image projecting apparatus to which a zoom lens system embodying the present invention is applicable. In this apparatus, an image of a microfilm held by a microfilm holder 1 comprising two flat glass plates is projected onto a screen 7 through a zoom lens system 2, an image rotating prism 3 and mirrors 4–6. A dove prism may be effective for use as the image rotating prism 3 for compactness of the prism itself, in the image projecting apparatus having a certain angle of view. However, in order for the entire projected image to enter this prism 3, it is desirable to arrange the zoom lens system 2 and prism 3 as close to each other as possible, and to arrange the pupil position of the projecting lens 2 to the prism 3 as close as possible.

Figure 3:
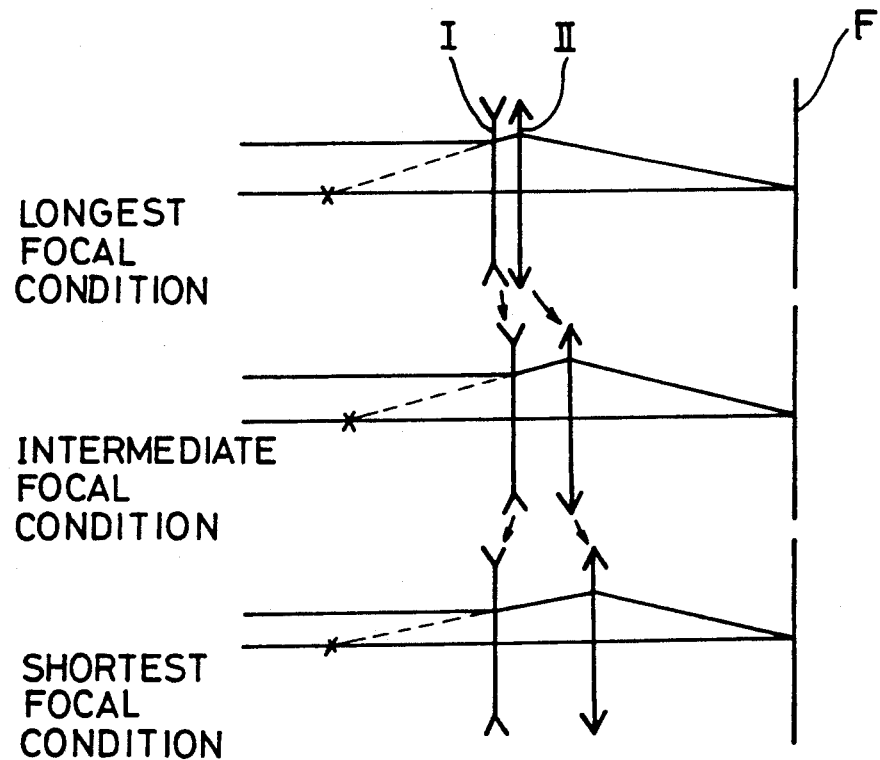
FIG. 3 is a diagram showing movement of a conventional two group zoom lens system.
Figure 4:
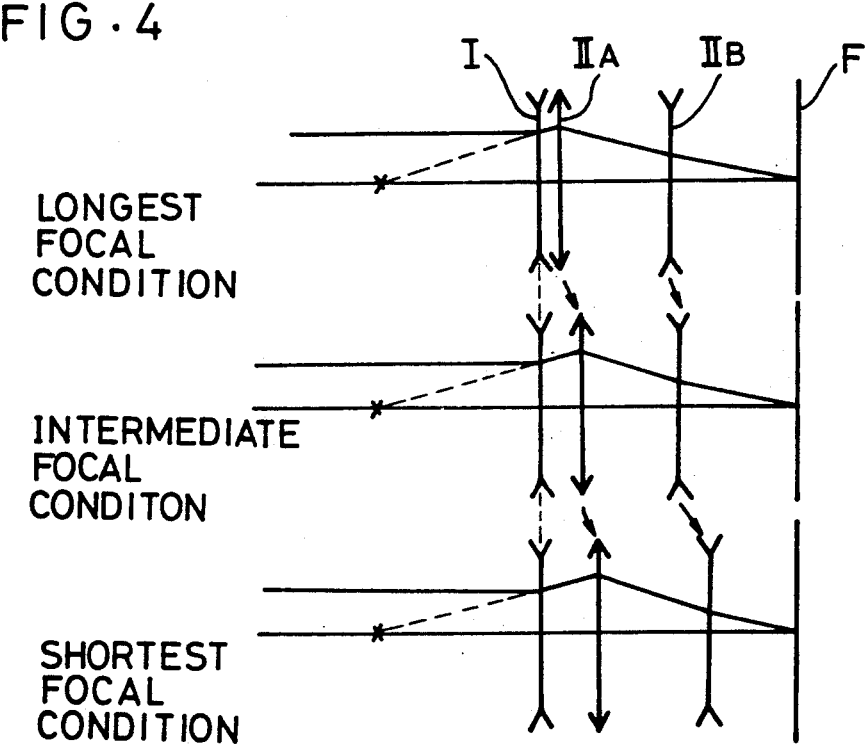
FIG. 4 is a diagram showing movement of a three group zoom lens system according to the present invention.
Figure 6B:
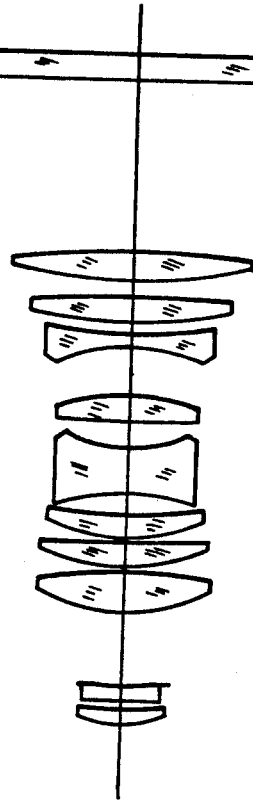
Figure 6C:
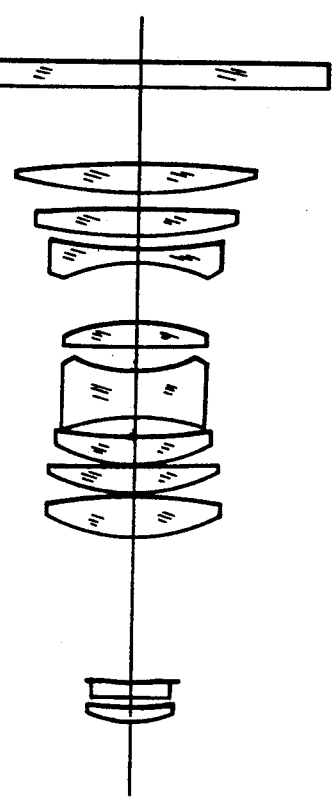
Figure 6A:
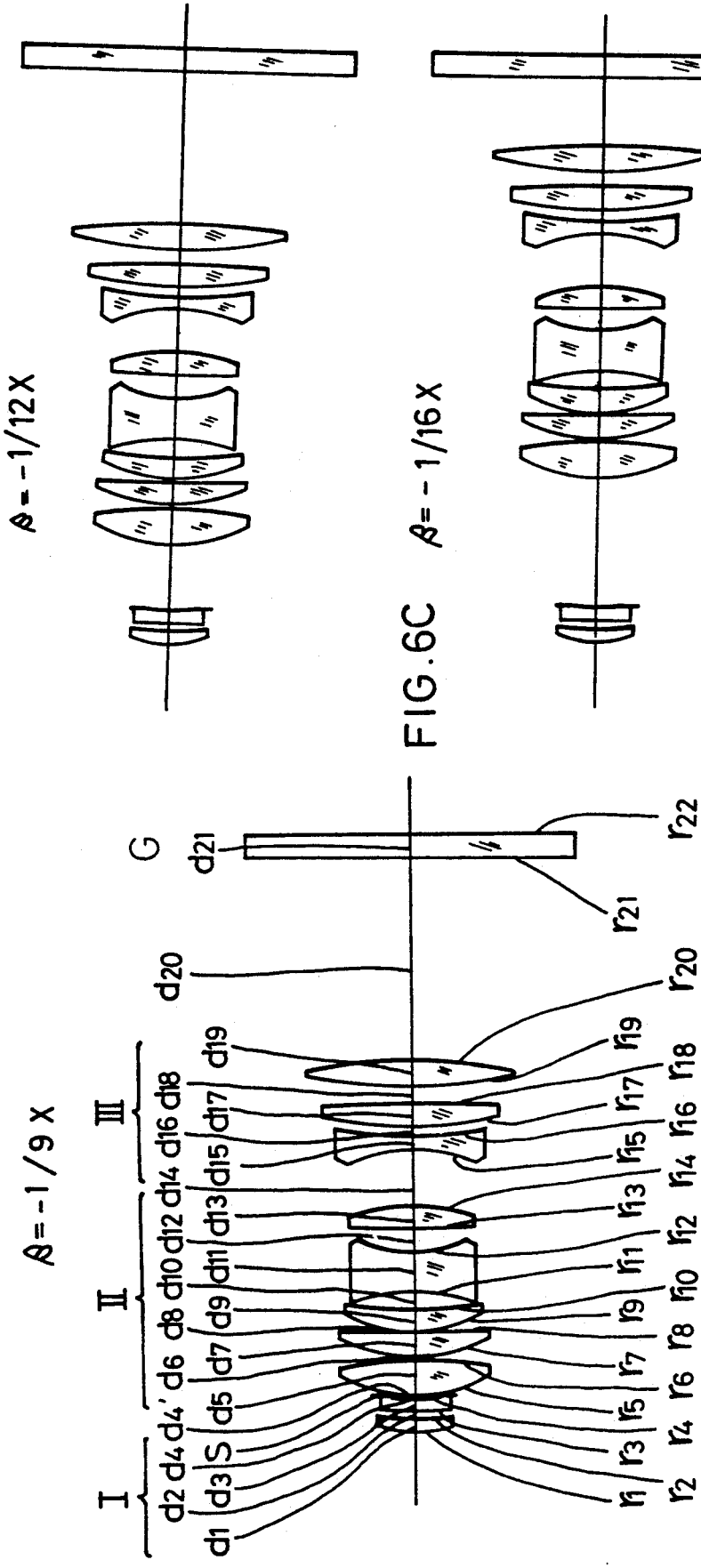
Figure 7B:
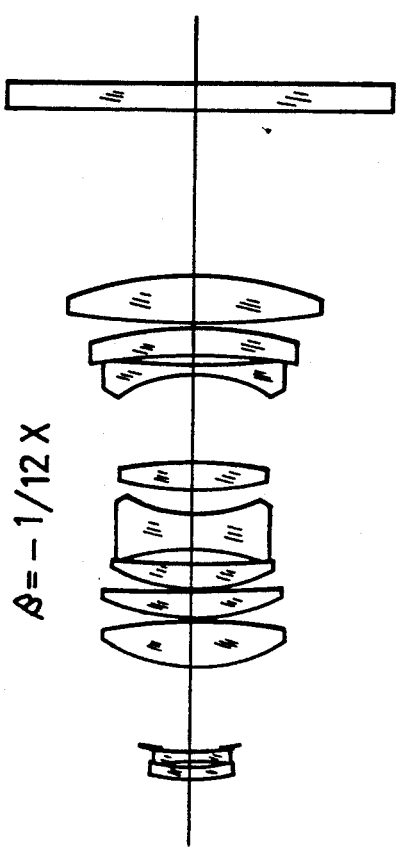
Figure 7C:
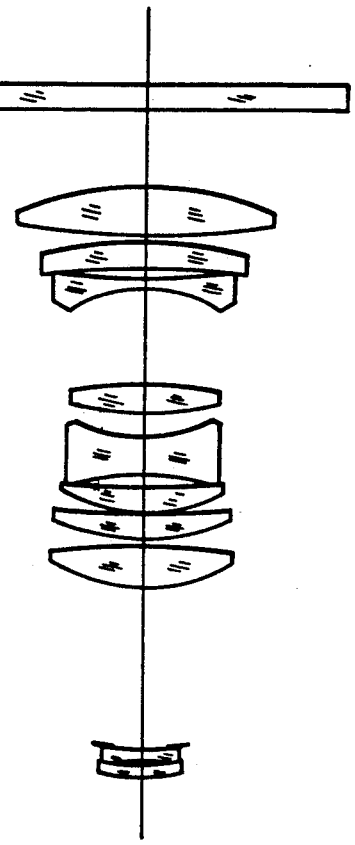
Figure 7A:
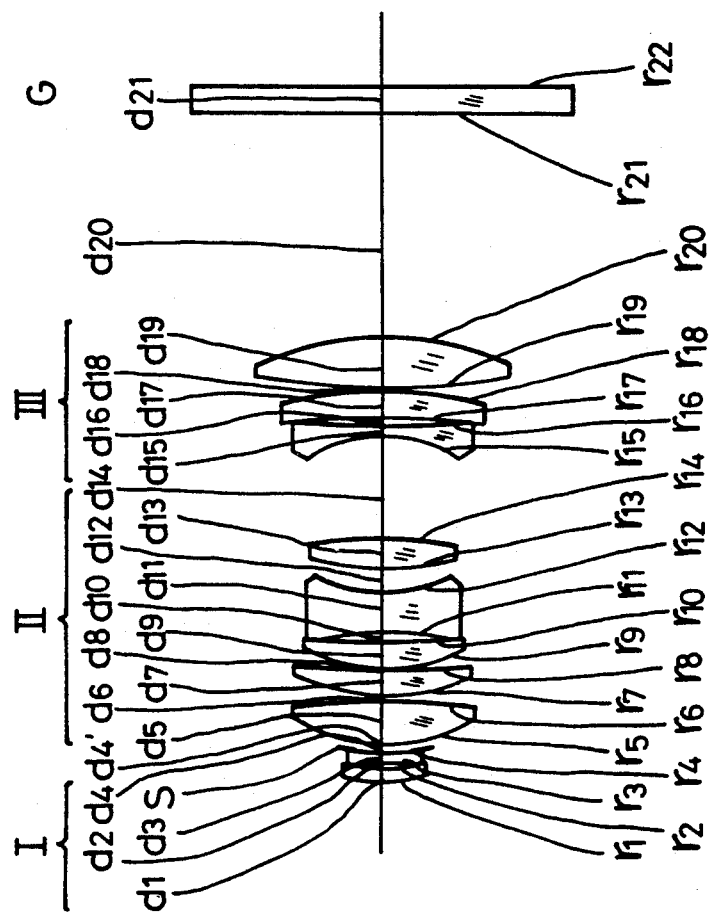
Figure 10A:
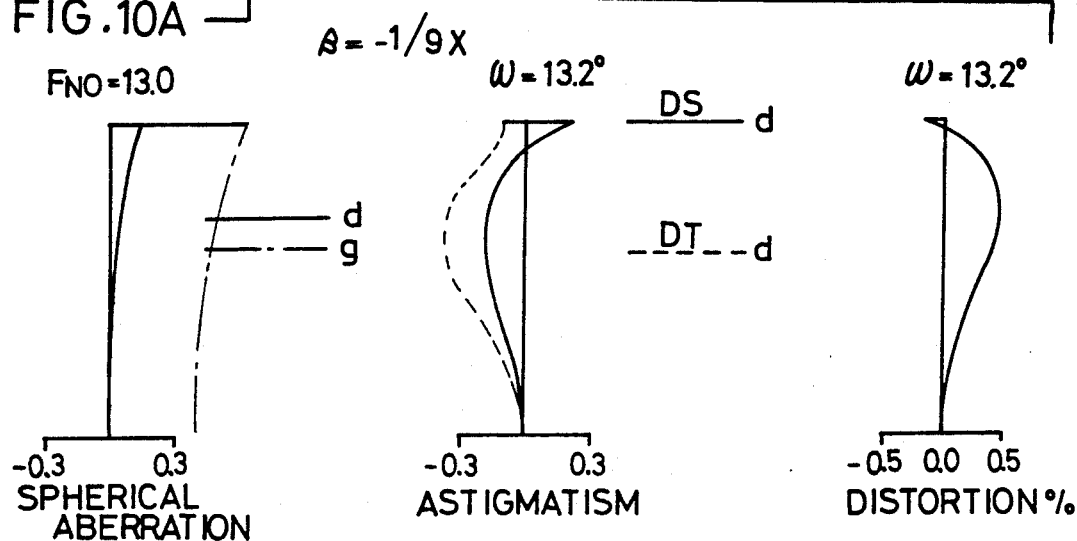
Figure 10B:
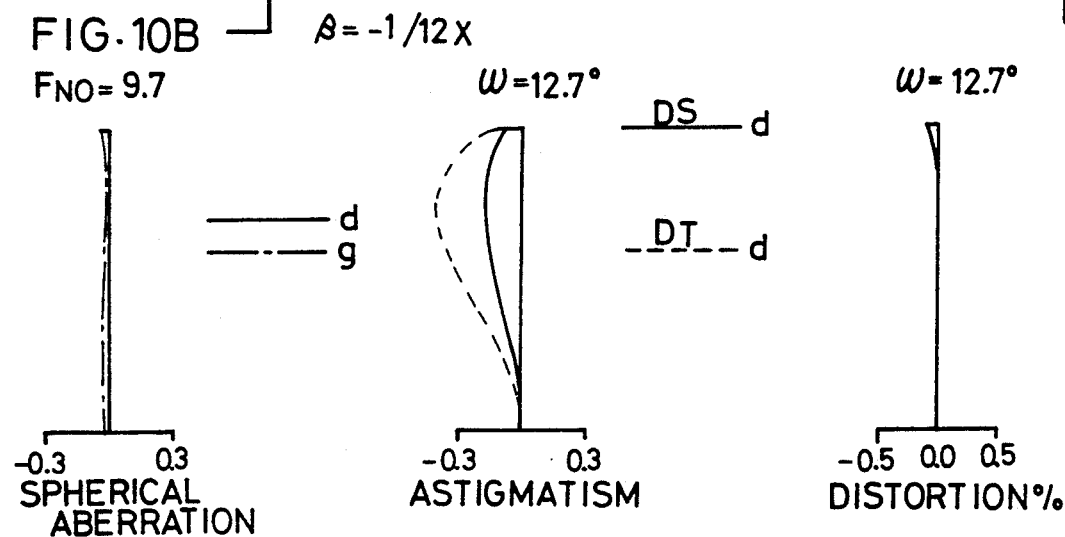
Figure 10C:
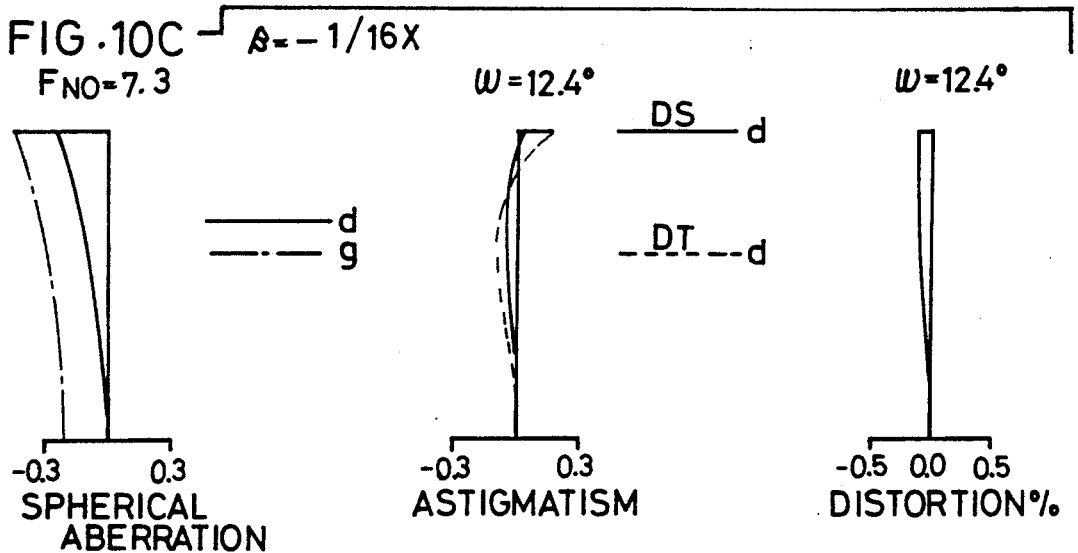

With a zoom lens system used in such as image projecting apparatus, there is no great limitation to the back focus but there is a limitation to the length of the entire system. The length of the entire system may be reduced by disposing a negative lens unit closest to a reduction side (the film side) to form a telephoto type, and moreover this negative lens unit may be used in zooming. The length of the entire system may be further reduced by disposing a negative lens unit closest to an enlargement side and by fixing this negative lens unit relative to the image plane. More particularly, in the case of a negative-positive two group zoom lens as shown in FIG. 3, a second lens unit II having a positive power essentially contributes to variation of magnification while a first lens unit I having a negative power acts to compensate for movement of an image point occurring with the variation of magnification. It is assumed for simplicity of illustration that the object point is at infinity, that this zoom lens system has a magnification range including real size ($\beta = -1$), and that the first lens unit I remains at the same position in a longest focal length condition and a shortest focal length condition. Where, as shown in FIG. 4, the second lens unit is divided into a positive lens unit IIA and a negative lens unit IIB, the respective lens units IIA and IIB may be moved to the reduction side during a zooming operation from the longest focal length condition to the shortest focal length condition. Zooming may be effected without increasing the number of zoom cams if compensation for the movement of an image point occurring with variation of magnification is made by adjusting the distance between the lens units IIA and IIB with the first lens unit I fixed while the magnification is varied through the movement of the lens units IIA and IIB.

Figure 1:
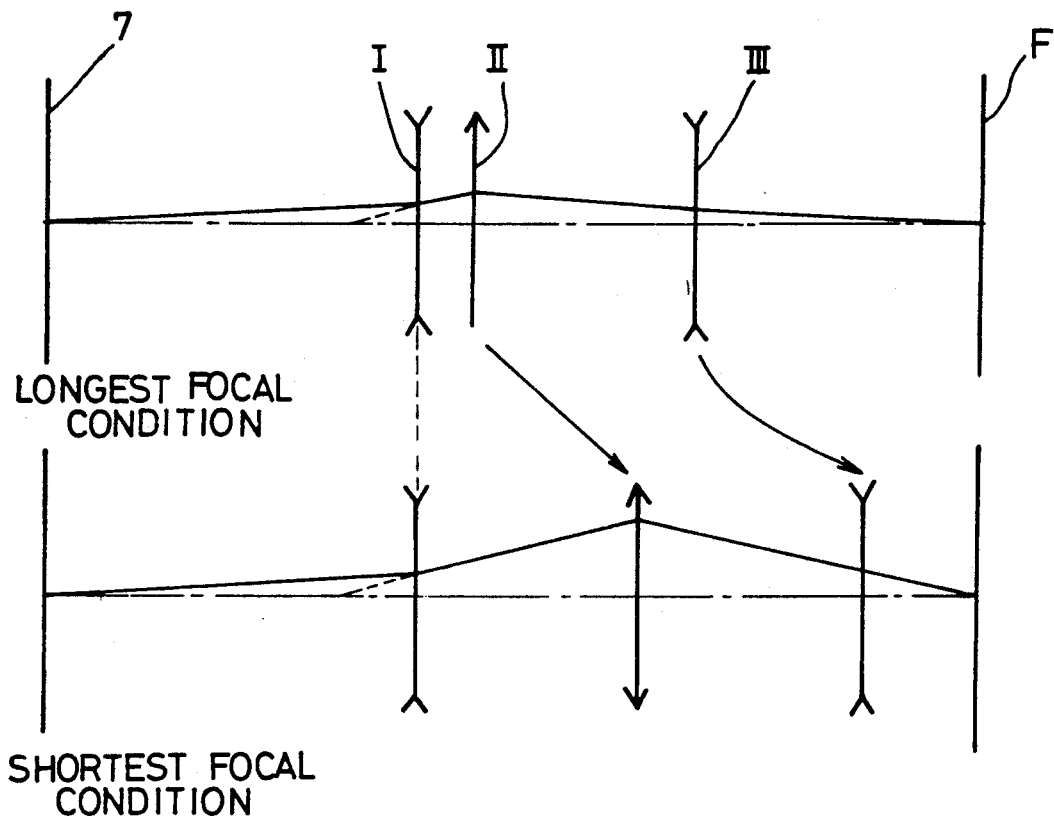
FIG. 1 is a diagram showing a paraxial power arrangement of a zoom lens system according to the present invention.

FIG. 1 shows the construction of the zoom lens system embodying the present invention. This zoom lens system comprises, from the enlargement side, a first lens unit I of a negative power which is fixed during a zooming operation, a second lens unit II of a positive power which is movable during a zooming operation, and a third lens unit III of a negative power which is movable during a zooming operation. An aperture stop S (not shown) is included in the first lens unit I and is fixed during a zooming operation. The second and third lens units II and III move toward a reduction side during a zooming operation from the longest focal length condition to the shortest focal length condition, with a distance between the second lens unit II and third lens unit III changing from a decreasing state to an increasing state. That is, the first lens unit I, second lens unit II and third lens unit III correspond to the first lens unit I, the lens unit IIA having a positive power, and the lens unit IIB having a negative power shown in FIG. 4, respectively. Thus, the third lens unit III in this zoom lens system acts to provide the telephoto type for reducing the length of the entire system. Since the first lens unit is fixed, the length of the entire system is constant. This construction realizes a compact and inexpensive zoom lens system having two zoom cams.

The distance between the second lens unit II and third lens unit III changes from the decreasing state to the increasing state while the zooming operation from the longest focal length condition to the shortest focal length condition is in progress. This feature reduces the amount of variation in the distance between the second lens unit II and third lens unit III, and enables excellent compensation for various aberrations, particularly for variations in the curvature of images and astigmatism.

The first lens unit I should preferably include a positive lens element adjacent its enlargement side in order to set the principal point of the entire system as close to the enlargement side as possible for minimizing the length of the entire system.

Further, the second lens unit II should preferably include at least two positive lens elements in a position closest to the enlargement side in order to reduce the distance between the principal points of the first and second lens units I and II in the longest focal length condition, thereby to minimize the length of the entire system.

It is desirable for this zoom lens system to satisfy the following conditional expressions [1] and [2]:

$$1.7 < (\Psi_I + \Psi_{II})/\Psi_L < 2.2 \quad [1]$$

$$2.5 < \Psi_{II\,III L}/\Psi_L < 3.0 \quad [2]$$

where $\Psi_I$ represents a refracting power of the first lens unit I, $\Psi_{II}$ represents a refracting power of the second lens unit II, $\Psi_L$ represents a refracting power of the entire system in the longest focal length condition, and $\Psi_{II\,III L}$ represents a combined refractive power of the second and third lens units II and III in the longest focal length condition.

The conditional expression [1] determines a ratio between a sum of refracting powers of the first and second lens units I and II (approximately a combined refracting power of the first and second lens units I and II in the longest focal length condition) and the refractive power of the entire system in the longest focal length condition. In the event of deviation from the lower limit of this conditional expression [1], sufficient compactness cannot be achieved. Above its upper limit, it will be difficult for the third lens unit III to compensate for various aberrations occurring at the first and second lens units I and II. The combined refracting power $\Psi_{III L}$ of the first and second lens units I and II in the longest focal length condition is expressed by the following equation:

$$\Psi_{III L} = \Psi_I + \Psi_{II} - e_{III L} \Psi_I \Psi_{II}$$

where $e_{III L}$ represents a calculated distance between the first and second lens units I and II (distance between the principal planes) in the longest focal length condition. Since the right-hand third term is a very small value, it is replaced with the sum of refracting powers of the first and second lens units I and II in the foregoing conditional expression [1].

The conditional expression [2] determines a ratio between a sum of refracting powers of the second and third lens units II and III in the longest focal length condition and the refractive power of the entire system in the longest focal length condition. In the event of deviation from the lower limit of this conditional expression [2], the second and third lens units II and III become movable to excessive extents to make a large zoom ratio impossible. Above its upper limit, the various aberrations occurring at the second and third lens units II and III become too large for compensation.

In the zoom lens system of this embodiment, the aperture stop S is fixedly provided inside or adjacent the first lens unit I. This reduces a beam width at the enlargement side regardless of a zooming operation, thereby to allow the image rotating prism to be small.

Specific examples will be described next. FIGS. 5A, 5B and 5C through 8A, 8B and 8C are sectional views of lens constructions in Examples 1 through 4. FIGS. 9A, 9B and 9C through 12A, 12B and 12C show aberration curves in Examples 1 through 4. Of these figures, FIGS. 9A, 10A, 11A and 12A show aberration curves of the respective examples in the longest focal length condition with the lateral magnification $\beta = -1/9 \times$, FIGS. 9B, 10B, 11B and 12B show those in the intermediate focal length condition with $\beta = -1/12 \times$, and FIGS. 9C, 10C, 11C and 12C show those in the shortest focal length condition with $\beta = -1/16 \times$. A plain parallel glass plate G disposed at an extreme reduction side is a film holder which, with an unillustrated further film holder, holds a microfilm.

TABLE 1

MAGNIFICATION - $1/9 \sim -1/12 \sim -1/16$  $(\psi_I + \psi_{II})/\psi_L = 2.04$
$f = 100.0 \sim 79.5 \sim 62.3$  $\psi_{II\ III} L/\psi_L = 2.85$
Ext.P $= -76 \sim -72 \sim -71$  $\infty TL/f_L = 0.86$

|   |   | RADIUS OF CURV. | AXIAL DIS-TANCE | REFRACT. IND.(Nd) | | ABBE No. (νd) |
|---|---|---|---|---|---|---|
| I | $r_1$ | 20.70 | $d_1$ 1.88 | $N_1$ 1.6195 | $\nu_1$ | 43.1 |
|   | $r_2$ | 41.16 | $d_2$ 0.63 | | | |
|   | $r_3$ | −322.50 | $d_3$ 1.67 | $N_2$ 1.7200 | $\nu_2$ | 50.3 |
|   | $r_4$ | 28.51 | $d_4$ 0.63 | | | |
|   | S(STOP) - | | $d_4'$ 0.63~11.66~22.36 | | | |
| II | $r_5$ | 23.88 | $d_5$ 5.65 | $N_3$ 1.4931 | $\nu_3$ | 83.6 |
|   | $r_6$ | −83.13 | $d_6$ 0.74 | | | |
|   | $r_7$ | 28.36 | $d_7$ 3.70 | $N_4$ 1.4931 | $\nu_4$ | 83.6 |
|   | $r_8$ | 243.43 | $d_8$ 1.26 | | | |
|   | $r_9$ | 25.00 | $d_9$ 3.49 | $N_5$ 1.4931 | $\nu_5$ | 83.6 |
|   | $r_{10}$ | 102.83 | $d_{10}$ 1.83 | | | |
|   | $r_{11}$ | −40.71 | $d_{11}$ 5.55 | $N_6$ 1.8500 | $\nu_6$ | 40.0 |
|   | $r_{12}$ | 19.94 | $d_{12}$ 3.74 | | | |
|   | $r_{13}$ | 60.29 | $d_{13}$ 3.62 | $N_7$ 1.6195 | $\nu_7$ | 43.1 |
|   | $r_{14}$ | −41.85 | $d_{14}$ 9.43~7.89~9.13 | | | |
| III | $r_{15}$ | −20.20 | $d_{15}$ 2.09 | $N_8$ 1.7725 | $\nu_8$ | 49.8 |
|   | $r_{16}$ | 72.53 | $d_{16}$ 2.15 | | | |
|   | $r_{17}$ | 70.22 | $d_{17}$ 4.08 | $N_9$ 1.6129 | $\nu_9$ | 37.0 |
|   | $r_{18}$ | −73.72 | $d_{18}$ 2.74 | | | |
|   | $r_{19}$ | 112.88 | $d_{19}$ 4.18 | $N_{10}$ 1.6129 | $\nu_{10}$ | 37.0 |
|   | $r_{20}$ | −174.42 | $d_{20}$ 33.92~24.43~12.49 | | | |
| G | $r_{21}$ | ∞ | $d_{21}$ 3.14 | $N_{11}$ 1.5168 | $\nu_{11}$ | 64.2 |
|   | $r_{22}$ | ∞ | | | | |

TABLE 2

MAGNIFICATION - $1/9 \sim -1/12 \sim -1/16$  $(\psi_I + \psi_{II})/\psi_L = 1.97$
$f = 100.0 \sim 79.7 \sim 62.5$  $\psi_{II\ III} L/\psi_L = 2.80$
Ext.P $= -74 \sim -70 \sim -69$  $\infty TL/f_L = 0.85$

|   |   | RADIUS OF CURV. | AXIAL DIS-TANCE | REFRACT. IND.(Nd) | | ABBE No. (νd) |
|---|---|---|---|---|---|---|
| I | $r_1$ | 20.89 | $d_1$ 1.98 | $N_1$ 1.6195 | $\nu_1$ | 43.1 |
|   | $r_2$ | 44.62 | $d_2$ 1.38 | | | |
|   | $r_3$ | −220.52 | $d_3$ 1.81 | $N_2$ 1.7200 | $\nu_2$ | 50.3 |
|   | $r_4$ | 28.27 | $d_4$ 0.49 | | | |
|   | S(STOP) - | | $d_4'$ 0.0~10.82~21.35 | | | |
| II | $r_5$ | 25.64 | $d_5$ 5.73 | $N_3$ 1.4931 | $\nu_3$ | 83.6 |
|   | $r_6$ | −76.79 | $d_6$ 0.81 | | | |
|   | $r_7$ | 29.67 | $d_7$ 3.71 | $N_4$ 1.4875 | $\nu_4$ | 70.4 |
|   | $r_8$ | 7022.96 | $d_8$ 0.54 | | | |
|   | $r_9$ | 26.65 | $d_9$ 3.50 | $N_5$ 1.4875 | $\nu_5$ | 70.4 |
|   | $r_{10}$ | 88.13 | $d_{10}$ 2.70 | | | |
|   | $r_{11}$ | −39.49 | $d_{11}$ 6.72 | $N_6$ 1.8075 | $\nu_6$ | 35.4 |
|   | $r_{12}$ | 19.38 | $d_{12}$ 3.62 | | | |
|   | $r_{13}$ | 102.01 | $d_{13}$ 3.56 | $N_7$ 1.6200 | $\nu_7$ | 36.3 |
|   | $r_{14}$ | −36.49 | $d_{14}$ 9.42~7.48~9.16 | | | |
| III | $r_{15}$ | −24.39 | $d_{15}$ 2.09 | $N_8$ 1.7725 | $\nu_8$ | 49.8 |
|   | $r_{16}$ | 80.67 | $d_{16}$ 1.36 | | | |
|   | $r_{17}$ | 63.51 | $d_{17}$ 3.66 | $N_9$ 1.6129 | $\nu_9$ | 37.0 |
|   | $r_{18}$ | −405.29 | $d_{18}$ 2.73 | | | |
|   | $r_{19}$ | 77.85 | $d_{19}$ 3.87 | $N_{10}$ 1.6129 | $\nu_{10}$ | 37.0 |
|   | $r_{20}$ | −142.67 | $d_{20}$ 33.54~24.66~12.45 | | | |
| G | $r_{21}$ | ∞ | $d_{21}$ 3.14 | $N_{11}$ 1.5168 | $\nu_{11}$ | 64.2 |
|   | $r_{22}$ | ∞ | | | | |

TABLE 3

MAGNIFICATION - $1/9 \sim -1/12 \sim -1/16$  $(\psi_I + \psi_{II})/\psi_L = 1.92$
$f = 100.0 \sim 79.8 \sim 62.4$  $\psi_{II\ III} L/\psi_L = 2.78$
Ext.P $= -77 \sim -73 \sim -73$  $\infty TL/f_L = 0.87$

|   |   | RADIUS OF CURV. | AXIAL DIS-TANCE | REFRACT. IND.(Nd) | | ABBE No. (νd) |
|---|---|---|---|---|---|---|
| I | $r_1$ | 20.66 | $d_1$ 1.89 | $N_1$ 1.6195 | $\nu_1$ | 43.1 |
|   | $r_2$ | 38.49 | $d_2$ 0.44 | | | |
|   | $r_3$ | −366.98 | $d_3$ 1.68 | $N_2$ 1.7130 | $\nu_2$ | 53.9 |
|   | $r_4$ | 28.81 | $d_4$ 0.59 | | | |
|   | S(STOP) - | | $d_4'$ 0.66~11.53~22.40 | | | |
| II | $r_5$ | 23.94 | $d_5$ 6.16 | $N_3$ 1.4931 | $\nu_3$ | 83.6 |
|   | $r_6$ | −83.35 | $d_6$ 0.77 | | | |
|   | $r_7$ | 28.37 | $d_7$ 3.71 | $N_4$ 1.4931 | $\nu_4$ | 83.6 |
|   | $r_8$ | 215.76 | $d_8$ 0.44 | | | |
|   | $r_9$ | 25.52 | $d_9$ 3.08 | $N_5$ 1.4931 | $\nu_5$ | 83.6 |
|   | $r_{10}$ | 103.54 | $d_{10}$ 1.84 | | | |
|   | $r_{11}$ | −46.35 | $d_{11}$ 5.45 | $N_6$ 1.8500 | $\nu_6$ | 40.0 |
|   | $r_{12}$ | 20.32 | $d_{12}$ 3.74 | | | |
|   | $r_{13}$ | 49.20 | $d_{13}$ 3.63 | $N_7$ 1.6195 | $\nu_7$ | 43.1 |
|   | $r_{14}$ | −64.09 | $d_{14}$ 14.90~12.69~13.94 | | | |
| III | $r_{15}$ | −18.76 | $d_{15}$ 1.32 | $N_8$ 1.7725 | $\nu_8$ | 49.8 |
|   | $r_{16}$ | 206.65 | $d_{16}$ 1.21 | | | |
|   | $r_{17}$ | −109.93 | $d_{17}$ 3.63 | $N_9$ 1.6129 | $\nu_9$ | 37.0 |
|   | $r_{18}$ | −67.29 | $d_{18}$ 0.55 | | | |
|   | $r_{19}$ | 83.23 | $d_{19}$ 6.82 | $N_{10}$ 1.6129 | $\nu_{10}$ | 37.0 |
|   | $r_{20}$ | −49.43 | $d_{20}$ 31.90~23.25~11.12 | | | |
| G | $r_{21}$ | ∞ | $d_{21}$ 3.30 | $N_{11}$ 1.5168 | $\nu_{11}$ | 64.2 |
|   | $r_{22}$ | ∞ | | | | |

TABLE 4

MAGNIFICATION - $1/9 \sim -1/12 \sim -1/16$  $(\psi_I + \psi_{II})/\psi_L = 1.93$
$f = 100.0 \sim 79.4 \sim 62.2$  $\psi_{II\ III} L/\psi_L = 2.72$
Ext.P $= -79 \sim -76 \sim -77$  $\infty TL/f_L = 0.86$

|   |   | RADIUS OF CURV. | AXIAL DIS-TANCE | REFRACT. IND.(Nd) | | ABBE No. (νd) |
|---|---|---|---|---|---|---|
| I | $r_1$ | 20.59 | $d_1$ 1.88 | $N_1$ 1.6195 | $\nu_1$ | 43.1 |
|   | $r_2$ | 39.94 | $d_2$ 0.52 | | | |
|   | $r_3$ | −313.66 | $d_3$ 1.67 | $N_2$ 1.7130 | $\nu_2$ | 53.9 |
|   | $r_4$ | 28.38 | $d_4$ 0.63 | | | |
|   | S(STOP) - | | $d_4'$ 0.63~11.75~22.78 | | | |
| II | $r_5$ | 23.88 | $d_5$ 5.65 | $N_3$ 1.4931 | $\nu_3$ | 83.6 |
|   | $r_6$ | −83.13 | $d_6$ 0.74 | | | |
|   | $r_7$ | 28.24 | $d_7$ 3.70 | $N_4$ 1.4931 | $\nu_4$ | 83.6 |
|   | $r_8$ | 256.78 | $d_8$ 0.21 | | | |
|   | $r_9$ | 25.17 | $d_9$ 3.49 | $N_5$ 1.4931 | $\nu_5$ | 83.6 |
|   | $r_{10}$ | 103.26 | $d_{10}$ 1.83 | | | |
|   | $r_{11}$ | −46.23 | $d_{11}$ 4.22 | $N_6$ 1.8500 | $\nu_6$ | 40.0 |
|   | $r_{12}$ | 20.25 | $d_{12}$ 3.62 | | | |
|   | $r_{13}$ | 72.05 | $d_{13}$ 3.63 | $N_7$ 1.6195 | $\nu_7$ | 43.1 |
|   | $r_{14}$ | −48.89 | $d_{14}$ 14.19~12.11~13.48 | | | |
| III | $r_{15}$ | −18.94 | $d_{15}$ 1.20 | $N_8$ 1.7725 | $\nu_8$ | 49.8 |
|   | $r_{16}$ | 566.01 | $d_{16}$ 1.93 | | | |
|   | $r_{17}$ | −101.90 | $d_{17}$ 3.65 | $N_9$ 1.6129 | $\nu_9$ | 37.0 |
|   | $r_{18}$ | −68.99 | $d_{18}$ 0.52 | | | |
|   | $r_{19}$ | 90.70 | $d_{19}$ 5.75 | $N_{10}$ 1.6129 | $\nu_{10}$ | 37.0 |
|   | $r_{20}$ | −51.46 | $d_{20}$ 34.58~25.54~13.14 | | | |
| G | $r_{21}$ | ∞ | $d_{21}$ 3.14 | $N_{11}$ 1.5168 | $\nu_{11}$ | 64.2 |
|   | $r_{22}$ | ∞ | | | | |

Tables 1 through 4 show numeric data of the zoom lens systems in Examples 1 through 4. In these tables, r represents radii of curvature, d represents axial distances, N represents refractive indices of the lens elements, and ν represents Abbe numbers of the lens elements. Positions of the aperture stop S are also shown. In the respective examples, the focal length in the longest focal length condition is standardized to 100 mm, and the vignetting factor is 100%. These tables show numeric values for the conditional expressions [1] and [2], a ratio between a distance $TL_\infty$ from an end plane to an image plane at the reduction side of the zoom lens system in the longest focal length condition with the object point at infinity, and a maximum focal length $f_L$ (i.e. telephoto ratio), and paraxial pupil positions Ext.P. with the image plane at the reduction side regarded as the original point.

As is evident from the foregoing description, the zoom lens system of this embodiment is very compact with the value of telephoto ratio $T_{L\infty}/f_L$ at 0.85 to 0.87. This system has a relatively wide angle of view, and effectively compensates for various aberrations. Further, since the pupil position Ext.P. is $-70$ to $-80$, which is relatively distant from the microfilm plane, it allows an illumination optical system to have a small outside diameter and to be fixed.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A zoom lens system comprising, in order from an enlargement side:
   a first lens unit of a negative power;
   a second lens unit of a positive power, and
   a third lens unit of a negative power,
   wherein, during a zooming operation from a longest focal length condition to a shortest focal length condition, said first lens unit is fixed, whereas said second lens unit and said third lens unit are movable from the enlargement side to a reduction side, with the distance between said second lens unit and said third lens unit first decreasing, then increasing, during said zooming operation, the zoom lens system satisfying the following conditions:

$$1.7<(\Psi_I+\Psi_{II})/\Psi_L<2.2$$

$$2.5<\Psi_{II\ IIIL}/\Psi_L<3.0$$

where $\Psi_I$ represents a refracting power of said first lens unit, $\Psi_{II}$ represents a refracting power of said second lens unit, $\Psi_L$ represents a refracting power of the entire system in the longest focal length condition, and $\Psi_{II\ IIIL}$ represents a combined refractive power of said second and third lens units in the longest focal length condition.

2. A zoom lens system comprising, in order from an enlargement side:
   a first lens unit of a negative power which includes a positive lens element at a position closest to the enlargement side;
   a second lens unit of a positive power, and
   a third lens unit of a negative power,
   wherein, during a zooming operation from a longest focal length condition to a shortest focal length condition, said first lens unit is fixed, whereas said second lens unit and said third lens unit are movable from the enlargement side to a reduction side, with the distance between said second lens unit and said third lens unit first decreasing, then increasing, during said zooming operation.

3. A zoom lens system as claimed in claim 2, wherein said third lens unit includes a negative lens element at a position closest to the enlargement side.

4. A zoom lens system as claimed in claim 2, wherein said third lens unit includes a lens element having a convex surface facing the reduction side at a position closest to the reduction side.

5. A zoom lens system as claimed in claim 2, further comprising an aperture stop disposed adjacent said first lens unit.

6. A zoom lens system as claimed in claim 2, wherein said second lens unit includes, in order from the enlargement side, two positive lens elements, a lens element having a concave surface faced to the reduction side, and a positive lens element.

7. A zoom lens system comprising, in order from an enlargement side:
   a first lens unit of a negative power;
   a second lens unit of a positive power, and
   a third lens unit of a negative power,
   wherein, during a zooming operation from a longest focal length condition to a shortest focal length condition, said first lens unit is fixed, whereas said second lens unit and said third lens unit are movable from the enlargement side to a reduction side, with a distance between said second lens unit and said third lens unit first decreasing, then increasing, during said zooming operation, and an aperture stop is disposed adjacent said first lens unit during the zooming operation.

8. A zoom lens system as claimed in claim 7, wherein said third lens unit includes a negative lens element at a position closest to the enlargement side.

9. A zoom lens system as claimed in claim 7, wherein said third lens unit includes a lens element having a convex surface facing the reduction side at a position closest to the reduction side.

10. A zoom lens system as claimed in claim 7, wherein said second lens unit includes, in order from the enlargement side, two positive lens elements, a lens element having a concave surface faced to the reduction side, and a positive lens element.

11. A zoom lens system comprising, in order from an enlargement side:
    a first lens unit of a negative power;
    a second lens unit of a positive power including, from the enlargement side, two positive lens elements, and
    a third lens unit of a negative power including a negative lens element at a position closest to the enlargement side,
    wherein, during a zooming operation from a longest focal length condition to a shortest focal length condition, said first lens unit is fixed, whereas said second lens unit and said third lens unit are movable from the enlargement side to a reduction side, with the distance between said second lens unit and said third lens unit first decreasing, then increasing, during said zooming operation.

12. A zoom lens system as claimed in claim 11, further comprising an aperture stop disposed adjacent said first lens unit.

13. A zoom lens system comprising, in order from an enlargement side:
    a first lens unit of a negative power;
    a second lens unit of a positive power including, from the enlargement side, two positive lens elements, and
    a third lens unit of a negative power including a lens element having a convex surface facing the reduction side at a position closest to the reduction side,
    wherein, during a zooming operation from a longest focal length condition to a shortest focal length condition, said first lens unit is fixed, whereas said second lens unit and said third lens unit are movable from the enlargement side to a reduction side, with the distance between said second lens unit and said third lens unit first decreasing, then increasing, during said zooming operation.

14. A zoom lens system as claimed in claim 13, further comprising an aperture stop disposed adjacent said first lens unit.

* * * * *